(12) United States Patent
Fukasawa

(10) Patent No.: US 11,905,219 B2
(45) Date of Patent: Feb. 20, 2024

(54) ALUMINA CERAMIC

(71) Applicant: CoorsTek KK, Tokyo (JP)

(72) Inventor: Yuji Fukasawa, Hadano (JP)

(73) Assignee: COORSTEK KK, Tokyo (JP)

( * ) Notice: Subject to any disclaimer, the term of this patent is extended or adjusted under 35 U.S.C. 154(b) by 51 days.

(21) Appl. No.: 17/394,459

(22) Filed: Aug. 5, 2021

(65) Prior Publication Data

US 2022/0098111 A1    Mar. 31, 2022

(30) Foreign Application Priority Data

Sep. 28, 2020  (JP) ................................ 2020-162410

(51) Int. Cl.
  *C04B 35/117*  (2006.01)
  *C04B 35/10*  (2006.01)

(52) U.S. Cl.
  CPC ............ *C04B 35/10* (2013.01); *C04B 35/117* (2013.01); *C04B 2235/3205* (2013.01); *C04B 2235/77* (2013.01)

(58) Field of Classification Search
  CPC ................... C04B 35/10; C04B 35/117; C04B 2235/3205; C04B 2235/77; C04B 35/115
  See application file for complete search history.

(56) References Cited

U.S. PATENT DOCUMENTS

| | | | | |
|---|---|---|---|---|
| 2011/0039685 A1* | 2/2011 | Mao | .................... | C04B 35/6455 501/153 |
| 2011/0077141 A1* | 3/2011 | Walker | .................. | C04B 35/111 501/120 |
| 2012/0306365 A1* | 12/2012 | Du | .................... | C04B 35/63424 313/636 |

FOREIGN PATENT DOCUMENTS

| | | |
|---|---|---|
| JP | 2013095621 A | 5/2013 |
| JP | 2014111524 A | 6/2014 |
| JP | 2014214064 A | 11/2014 |
| JP | 201664971 A | 4/2016 |
| KR | 20130091248 A | 8/2013 |
| WO | 2011133741 A1 | 10/2011 |

OTHER PUBLICATIONS

Matsuda, Namio et al., "Secondary Electron Emission of TiN/alumina", The 30th Annual Symposium of the Vacuum Society of Japan Proceedings, 1990, vol. 33, No. 3, pp. 343-345, and an English translation thereof. (11 pages).

(Continued)

*Primary Examiner* — Karl E Group
*Assistant Examiner* — Cameron K Miller
(74) *Attorney, Agent, or Firm* — BUCHANAN INGERSOLL & ROONEY PC

(57) ABSTRACT

Provided is an alumina ceramic with a low secondary electron emission coefficient and suitable for components of a high frequency generator, a plasma generator and so on. The alumina ceramic contains alumina as a main component, and at least two kinds of elements selected from an alkaline earth metal and from an element belonging to period 3, 4 or 5. The alkaline earth metal and the element belonging to period 3, 4 or 5 have a higher first ionization energy than aluminum. An electronegativity difference between the alkaline earth metal and the element belonging to period 3, 4 or 5 is 0 or more and 0.6 or less. A ratio (x/y) of the grain boundary area (x) to the grain area (y) in the alumina ceramic is 0.0001 to 0.001.

5 Claims, 1 Drawing Sheet

(56) References Cited

OTHER PUBLICATIONS

Matsuda, Namio, et al., "Measurements of Secondary Electron Emission and Cathodeluminescence for Alumina Microwave Windows", 27th Annual Symposium of the Vacuum Society of Japan Proceedings, 1987, vol. 30, No. 5, pp. 226-229 and an English translation thereof. (13 pages).

Yamamoto, Yasuchika, et al., "Ceramic Study on RF Windows for Power Coupler, Waveguide, and Klystron in Particle Accelerator" The 19th International Conference on RF Superconductivity, SRF2019, Dresden, Germany, JACoW Publishing, 2019, pp. 255-259. (5 pages).

Office Action (Request for the Submission of an Opinion) dated Jun. 16, 2023, by the Korean Patent Office in corresponding Korean Patent Application No. 10-2021-0102828, and an English Translation of the Office Action. (9 pages).

Office Action (Notice of Reasons for Refusal) dated Aug. 22, 2023, in corresponding Japanese Patent Application No. 2020-162410 and English translation of the Office Action. (8 pages).

\* cited by examiner

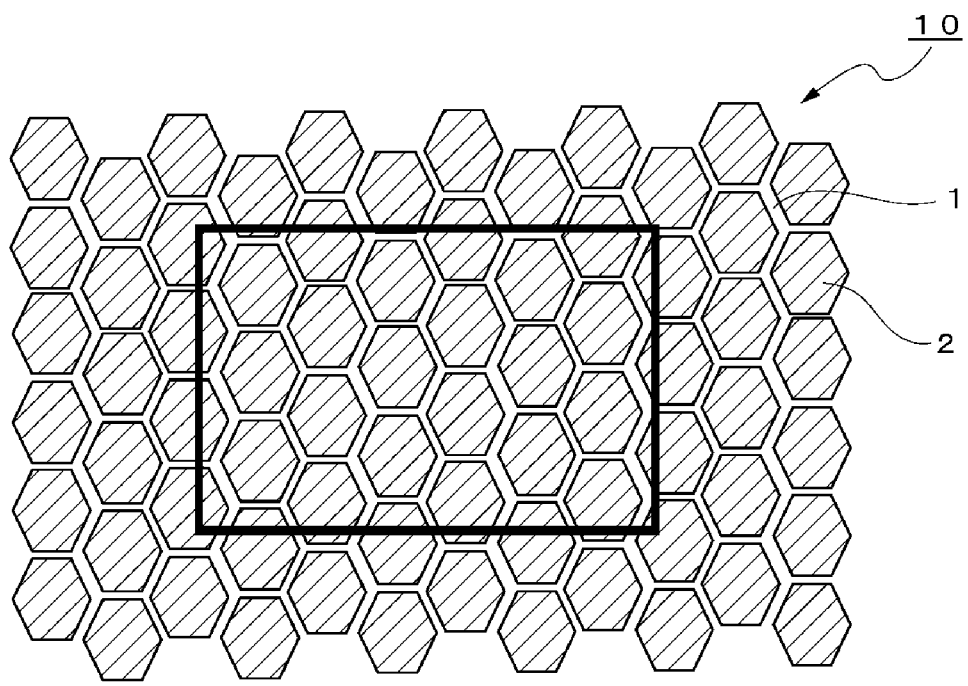

ALUMINA CERAMIC

BACKGROUND OF THE INVENTION

Field of Invention

The present invention relates to alumina ceramic used as components of a high frequency generator and a plasma generator.

Description of the Related Art

Dielectric ceramic is used as components of a high frequency generator and a plasma generator. Utilization of the dielectric ceramics has recently become popular in a region of 3 GHz or higher, and low dielectric materials are required in order to suppress the transmission loss. Among the low dielectric materials, alumina materials have a low dielectric loss and are used as a waveguide for a high frequency electronic circuit and a transmission window material for the high frequency window of a klystron.

However, a normal alumina sintered body, whose alumina content is possibly 99.9% or more, has a dielectric loss (tan δ) of not less than $1\times10^{-4}$ in the region of high frequency, e.g., a frequency of 2 to 9 GHz. When a lower electric loss tan δ, or less than $1\times10^{-4}$ is requested, sapphire ($Al_2O_3$ single crystal) must be used. Sapphire, which is more expensive and inferior in the strength, has disadvantages in terms of miniaturization of components, high reliability and low cost.

According to JP 2014-111524 A, crystalline alumina should be contained in an amount of 80 mass % or more, and further, a transition metal oxide and an alkaline earth metal oxide should be added in order to reduce the dielectric loss from an inexpensive polycrystalline alumina sintered body with high strength.

However, when the high frequency generator and the plasma generator have higher output, electrons are emitted from the alumina material due to the discharge phenomenon inside the device, which leads to local degeneration called multipactor on the surface of the alumina material. In this phenomenon, accelerated electrons collide with the alumina material to emit electrons and the electrons emitted from the alumina material are accelerated and collide with the alumina material again. The emission of electrons is repeated in this way and the alumina material is destroyed.

In the conventional method, TiN film formed on the alumina material absorbs electrons emitted from the alumina material (secondary electron emission) and thereby mitigates the multipactor discharge (Yamamoto, Yasuchika et al., "Ceramic Study on RF Windows for Power Coupler, Waveguide, and Klystron in Particle Accelerator" The 19th International Conference on RF Superconductivity, SRF2019, Dresden, Germany.). In addition, it is reported that a thick TiN film is more preferable for suppressing secondary electron emission (Matsuda, Namio et al., "Secondary Electron Emission of TiN/alumina", The 30th Annual Symposium of the Vacuum Society of Japan Proceedings, Vol. 33, No. 3, p. 343-345, 1990.).

However, TiN film deteriorates over time. Therefore, when various tests are carried out and manufacturing devices are used, the deteriorated TiN film may cause noise and pollution, which depends on the operating environment. As for the devices such as a CVD device and an etching device used in the process of manufacturing semiconductor, Ti could be the pollution source without sufficient durability to the operating environment, e.g., gas and plasma. As a result, the frequency of damage may increase due to the electrical discharge during operation, etc.

SUMMARY OF THE INVENTION

An object of the present invention is to provide alumina ceramic with a small secondary electron emission coefficient and suitable for components of a high frequency generator, a plasma generator and so on.

The present invention provides alumina ceramic containing alumina as a main component and at least two kinds of elements; that is to say, one is an alkaline earth metal and the other is an element belonging to period 3, 4 or 5. Both of the alkaline earth metal and the element belonging to period 3, 4 or 5 have a higher first ionization energy than aluminum. An electronegativity difference between the alkaline earth metal and the element belonging to period 3, 4 or 5 is 0 or more and 0.6 or less, and a ratio (x/y) of the grain boundary area (x) to the grain area (y) in the alumina ceramic is 0.0001 to 0.001.

Preferably, in the present invention, the density is 3.8 $g/cm^3$ or more and 4.0 $g/cm^3$ or less.

The alumina ceramic can be used suitably as components of a high frequency generator and a plasma generator.

The present invention can provide the alumina ceramic with a small secondary electron emission coefficient by adjusting the grain size and the roundness of source material particles such as the alumina source and investigating the organization structure of alumina ceramic. Accordingly, the alumina ceramic can be suitably used as components of a high frequency generator and a plasma generator, e.g., a support jig for a waveguide and a high frequency window of a klystron. The alumina ceramic can be also suitably used for industrial machinery, such as a CVD device and an etching device, by making full use of its excellent plasma resistance.

BRIEF DESCRIPTION OF DRAWING

FIG. 1 shows a method of calculating the ratio (x/y) of the grain boundary area (x) to the grain area (y) in the alumina ceramic. The ratio (x/y) is calculated from an area (x) versus an area (y) in the square.

DESCRIPTION OF THE PREFERRED EMBODIMENTS

Hereinafter, the alumina ceramic of the present invention will be described in detail. The present invention provides alumina ceramic comprising alumina as a main component, and at least two kinds of elements selected from an alkaline earth metal and from an element belonging to period 3, 4 or 5. The alkaline earth metal and the element belonging to period 3, 4 or 5 have a higher first ionization energy than aluminum, an electronegativity difference between the alkaline earth metal and the element belonging to period 3, 4 or 5 is 0 or more and 0.6 or less, and a ratio (x/y) of the grain boundary area (x) to the grain area (y) in the alumina ceramic is 0.0001 to 0.001.

High purity materials with a purity of ≥99.9% are used as an alumina source for a main component of the alumina ceramic. Some alkali metals are contained in the alumina source as an inevitable impurity. Alkali metal promotes grain growth, but it is practically quite difficult to control the content precisely. Therefore, in the present invention, the amount of the alkali metal contained in the alumina source is generally 100 ppm or less and more preferably 20 ppm or less.

The alumina ceramic comprises the alumina source as a main component, and contains an alkaline earth metal and an element belonging to period 3, 4 or 5. More specifically, in addition to the alumina source as a main component, the alumina ceramic comprises at least two kinds of elements consisting of at least one of alkaline earth metals and at least one of elements belonging to period 3, 4 or 5.

The total content of the alkaline earth metals and the elements belonging to period 3, 4 or 5 in the alumina ceramic is usually 1 wt % or less, specifically, 0.05 wt % or more and 1 wt % or less based on the content of the alumina source.

In the present invention, both of the alkaline earth metals and the elements belonging to period 3, 4 or 5 have a higher first ionization energy than aluminum.

To be specific, these have a first ionization energy of more than 577 kJ/mol which corresponds to that of aluminum. The first ionization energy can be obtained by photoelectron yield spectroscopy (PYS).

Examples of the alkaline earth metal are magnesium (Mg with a first ionization energy of 738 kJ/mol) and calcium (Ca with a first ionization energy of 590 kJ/mol). Among alkali metals and alkaline earth metals, strontium (Sr with a first ionization energy of 550 kJ/mol) and barium (Ba with a first ionization energy of 503 kJ/mol) have a lower first ionization energy than aluminum, and therefore they are not very desirable.

Examples of element belonging to period 3, 4 or 5 include silicon (Si), scandium (Sc), cobalt (Co), nickel (Ni), copper (Cu), yttrium (Y), titanium (Ti), zirconium (Zr), vanadium (V) and niobium (Nb). Among these, preferable examples are Sc (a first ionization energy of 633 kJ/mol), Ti (a first ionization energy of 660 kJ/mol), Y (a first ionization energy of 600 kJ/mol), Zr (a first ionization energy of 640 kJ/mol) and Nb (a first ionization energy of 652 kJ/mol), because they are inexpensive and easily obtainable.

The alkaline earth metal and the elements belonging to period 3, 4 or 5 used in the present invention cannot be cationic easily compared with aluminum and are more chemically stable than aluminum. When the high ionization characteristic of aluminum is present with such an alkaline earth metal and element belonging to period 3, 4 or 5 that are chemically more stable than aluminum, the surface and the grain boundary of the alumina ceramic are passivated, and thereby the defect generation is suppressed.

When the alkaline earth metals are added to the alumina source, the grain boundary occurs between aluminum particles and alkaline earth metal particles. The addition of the element belonging to period 3, 4 or 5 besides the alkaline earth metal can stabilize the grain boundary, as described above.

In the present invention, an electronegativity difference between the alkaline earth metal and the element belonging to period 3, 4 or 5 is 0 or more and 0.6 or less and more preferably 0 or more and 0.3 or less.

The electronegativity of each element is a value determined by Pauling's definition. When the electronegativity differences are within the above range, presumably the localization of charge in the alumina ceramic is little and the electrical action to the incident electron is hardly generated.

In an embodiment of the above-described alumina ceramic, there exist the alkaline earth metal and the element belonging to period 3, 4 or 5, which have a higher first ionization energy than aluminum in the grain boundary of alumina, and the electronegativity difference between the alkaline earth metal and the element belonging to period 3, 4 or 5 is small.

Preferable combinations between the alkaline earth metal and the element belonging to period 3, 4 or 5 include Mg—Sc (an electronegativity difference: 1.3−1.4=|0.1|), Mg—Ti (an electronegativity difference: 1.3−1.5=|0.2|), Mg—Y (an electronegativity difference: 1.3−1.2=|0.1|), Ca—Sc (an electronegativity difference: 1.0−1.4=|0.4|), Ca—Y (an electronegativity difference: 1.0−1.2=|0.2|) and Ca—Zr (an electronegativity difference: 1.0−1.3=|0.3|). Another embodiment in which the electronegativity difference is smaller includes Mg—Zr (an electronegativity difference: 1.3−1.3=|0|).

As to the combination of the above-described elements, an electronegativity difference between the alkaline earth metal and the element belonging to period 3, 4 or 5 is 0 or more and 0.6 or less in the grain boundary, which is sufficiently small.

Particle size (median size) of the alumina source is usually 0.1 μm or more and 5.0 μm or less and preferably 0.2 μm or more and 1.5 μm or less, considering the sintering densification of the alumina ceramic. Circularity of particles of the alumina source is preferably not less than 0.5.

Particle size (median size) of the alkaline earth metals is usually 0.1 μm or more and 1 μm or less and circularity of particles is not less than 0.5. Particle size (median size) of the elements belonging to periods 3, 4 and 5 is usually 0.1 μm or more and 1 μm or less and circularity of particles is not less than 0.5.

A feature of the present invention lies in that the ratio (x/y) of the grain boundary area (x) to the grain area (y) in the alumina ceramic is 0.0001 to 0.001.

The alumina ceramic of the present invention is manufactured by a conventionally known method. For example, to an alumina source, an alkaline earth metal oxide and an element belonging to period 3, 4 or 5 are added, and the mixture of the source materials thus obtained is molded by various methods, such as extrusion, cold isostatic pressing (CIP), injection molding, casting, and gel casting. After the arbitrary process of degreasing in an air atmosphere, the molded product is sintered in an air atmosphere or a reducing atmosphere.

In order to have a uniform particle size, the alumina ceramic of the present invention should be adjusted so that the particle size of the outer peripheral part is smaller and is getting larger toward the inner peripheral part. This is because during sintering, the grain growth of the outer peripheral part in the mixture of the source materials goes first and then the grain growth of the inner peripheral part follows, and thereby the particle sizes of both outer peripheral part and inner peripheral part become uniform when the sintering is completed.

In the present invention, the ratio (x/y) of the grain boundary area (x) to the grain area (y) in the alumina ceramic obtained by the above process is 0.0001 or more and 0.001 or less and preferably 0.0001 or more and 0.0005 or less.

FIG. 1 shows a method of calculating the ratio (x/y) of the area (x) of the grain boundary 1 to the area (y) of the grain 2 in the alumina ceramic 10. The x/y ratio is obtained by dividing the total area (x) of the grain boundary 1 by the total area (y) of grain 2 in a square frame. The x/y ratio is obtained as follows: a thermal etching is carried out on the surface of the alumina ceramic, a cross-sectional photo is taken with a scanning electron microscope (SEM), and then the x/y ratio is measured with a commercially available image analysis software. The x/y ratio can be adjusted by appropriately selecting the size and the circularity of particles of alumina sources, alkaline earth metal oxides, and oxides of elements belonging to periods 3, 4 and 5.

The secondary electron emission coefficient is widely used as one of characteristics of the alumina ceramic. The secondary electron emission coefficient is a coefficient representing the degree of secondary electron emission. In the present invention, the secondary electron emission coefficient of the alumina ceramic is preferably 5.0 or less and more preferably 2.5 or less.

In the present invention, the reason why the secondary electron emission coefficient has a correlation with the x/y ratio is outlined below.

According to Matsuda, Namio et al., "Secondary Electron Emission and Cathode Luminescence of Alumina RF Windows", 27th Annual Symposium of the Vacuum Society of Japan Proceedings, Vol. 30, No. 5, p. 446-449, 1987, the multipactor effect occurs when alumina itself has a secondary electron emission coefficient of more than 1 in a certain energy field, or the secondary electron emission coefficient as a whole becomes more than 1 due to the segregation of sintering aids (MgO, CaO, etc.,) mixed with alumina.

Presumably, the secondary electron emission coefficient is affected by the kinds of additives such as a sintering aid. After alumina being sintered, the additives are apt to stay in the so-called grain boundary, that is to say, outside the alumina composition. In order to reduce the secondary electron emission coefficient, it is necessary to make the grain boundary area as small as possible.

In the present invention, the influence of the grain boundary is evaluated by the ratio (x/y) of the grain boundary area (x) to the alumina grain area (y) in the alumina ceramic. The two-dimensional image of the surface of the alumina ceramic observed with a scanning electron microscope (SEM) and so forth indicates that the grain boundary area (x) generated at the boundary of alumina particles is smaller compared with the alumina grain area (y), that is to say, the smaller the x/y ratio is, the more sufficiently the secondary electron emission coefficient can be reduced.

However, it is impossible to reduce the grain boundary to zero. And there is a limit to the reduction of the x/y ratio in the method of producing a sintered body by sintering source material powders, when a balance with particle size is taken into account. In the present invention, the lower limit of the x/y ratio is 0.0001, which is within a practical range. When the x/y ratio exceeds 0.001, the secondary electron emission coefficient cannot be sufficiently reduced.

When the alumina ceramic of the present invention is manufactured, alkaline earth metals are used in the form of oxides, such as magnesium oxide (MgO) and calcium oxide (CaO). Elements belonging to periods 3, 4 and 5 are available in the form of oxides at a low price. They are normally used in the form of silicon dioxide ($SiO_2$), scandium oxide (III) ($Sc_2O_3$), titanium oxide (IV) ($TiO_2$), cobalt oxide (CoO, $Co_2O_3$ or $Co_3O_4$), nickel oxide (II) (NiO), copper oxide (II) (CuO), zirconium oxide ($ZrO_2$), yttrium oxide ($Y_2O_3$), vanadium oxide ($V_2O_5$) and niobium oxide ($Nb_2O_5$). In manufacturing the alumina ceramic, alkaline earth metal oxides play a role as a sintering aid and oxides of elements belonging to periods 3, 4 and 5 play a role in giving the grain boundary stability.

The density of the alumina ceramic of the present invention is preferably 3.8 $g/cm^3$ or more and 4.0 $g/cm^3$ or less. When the density is within the above-described range, the alumina ceramic is dense enough, the grain boundary is smaller than the grain, and the pore size is also smaller, which are desirable.

The alumina ceramic of the present invention is suitably used for a support jig for a waveguide, a high frequency window of a klystron, a CVD device and an etching device and so on in a high frequency generator, a plasma generator, etc.

EXAMPLES

Hereinafter, the present invention will be described in detail with reference to examples, but the present invention is not restricted to the examples.

[Experiment] (Test Nos. 1 to 17)

Alumina powder having a purity of 99.5% or more was prepared, and used properly on the basis of a median diameter of 1 to 8 μm for the sake of adjustment of density. Polyvinyl alcohol (PVA) was added to the alumina powder to prepare the source material. The source material powder was mixed for not less than 24 hours to prepare a slurry. The slurry was granulated, and the granulated powder filled the forming mold and then was compressed so as to shape a round substrate by CIP forming at a molding pressure of 1.8 tons. The molded body was degreased in an atmospheric air at 1000° C. and sintered in a hydrogen atmosphere at 1800° C.

As described in Table 1, alkaline earth metals such as Mg, Ca, Sr and Ba were used as additives for alumina. The elements belonging to periods 3 to 5 in the second column were used in accordance with Table 1. Each element was added in the form of oxide before granulation, and adjusted so that the total of alkali metals would not exceed a purity of 0.1% after sintering.

The alumina ceramics obtained were processed into a predetermined shape which was suitable for the measurement of the secondary electron emission coefficient, and the secondary electron emission coefficient at a surface roughness of 0.2 μm was measured using a scanning electron microscope (SEM) in the secondary electron mode of operation.

The x/y ratio was obtained as follows: a thermal etching was carried out, a cross-sectional photo was taken at an arbitrary position with a scanning electron microscope (SEM), and the image thus obtained was analyzed with a Mac-View manufactured by Mountech Co., Ltd.

The component element in alumina was evaluated with an ICP analyzer. The density was measured in accordance with JIS R 1634. Each value and the secondary electron emission coefficients are shown in Table 1.

TABLE 1

| No. | Alkaline earth metal a | Element b of periods 3 to 5 | x/y ratio | First ionization energy [kJ/mol] | | Electronegativity difference between a and b | Density after sintering [g/cm³] | Secondary electron emission coefficient |
|---|---|---|---|---|---|---|---|---|
| | | | | Alkaline earth metal a | Element b of periods 3 to 5 | | | |
| 1 | Ca | Y | 0.0005 | 590 | 600 | 0.2 | | 2.3 |
| 2 | Mg | Ti | 0.0003 | 738 | 659 | 0.2 | | 2.5 |
| 3 | Mg | Cr | 0.0003 | 738 | 630 | 0.4 | | 3.5 |
| 4 | Ca | Zr | 0.0005 | 590 | 640 | 0.3 | | 4.1 |
| 5 | Mg | Ti | 0.0012 | 738 | 659 | 0.2 | 3.9 | 5.2 |
| 6 | Ca | Ti | 0.0013 | 590 | 659 | 0.5 | 3.9 | 5.2 |
| 7 | Mg | Y | 0.0013 | 738 | 600 | 0.1 | 3.9 | 5.3 |
| 8 | Ca | Y | 0.002 | 590 | 600 | 0.2 | 3.8 | 5.3 |
| 9 | Sr | Ti | 0.0002 | 550 | 659 | 0.5 | | 5.5 |
| 10 | Sr | Y | 0.0004 | 550 | 600 | 0.2 | | 5.5 |
| 11 | Ba | Ti | 0.0003 | 503 | 659 | 0.6 | | 5.9 |
| 12 | Ba | Y | 0.0006 | 503 | 600 | 0.3 | | 6.0 |
| 13 | Mg | Ge | 0.0004 | 738 | 762 | 0.7 | | 5.2 |
| 14 | Ca | In | 0.0007 | 590 | 558 | 0.8 | | 6.0 |
| 15 | Ca | Si | 0.0004 | 590 | 787 | 0.9 | | 5.7 |
| 16 | Mg | Y | 0.0006 | 738 | 600 | 0.1 | 3.7 | 5.4 |
| 17 | Ca | Y | 0.0005 | 590 | 600 | 0.2 | 3.7 | 6.1 |

The results of Table 1 clearly showed that test Nos. 1 to 4, which comply with all the requirements of the present invention, exhibit secondary electron emission coefficients of less than 5.0. Notably, test Nos. 1 and 2, whose electronegativity difference between the alkaline earth metal and the element belonging to period 3, 4 or 5 is the smaller of the four, exhibited secondary electron emission coefficients of 2.5 or less. When the x/y ratio is within a predetermined range and the electronegativity difference between the two elements is made smaller, the synergistic effect is observed, which can bring a superior characteristic.

The x/y ratios of test Nos. 5 to 8 were beyond the scope of the present invention. As for test Nos. 9 to 12, any of the alkaline earth metals and the elements belonging to period 3, 4 or 5 did not have a higher first ionization energy than aluminum. As for test Nos. 13 to 15, the electronegativity differences between the alkaline earth metals and the elements belonging to period 3, 4 or 5 were more than 0.6. The results confirmed that the above-described three requirements are the important features of the present invention.

Denseness of test Nos. 16 and 17 exhibiting 3.7 g/cm³, far below 3.8 g/cm³, was significantly impaired, which indicated that the secondary electron emission coefficients got worse despite the scope of the present invention.

INDUSTRIAL APPLICABILITY

The alumina ceramic of the present invention is suitably used as components of a high frequency generator and a plasma generator, e.g., a support jig for a waveguide and a high frequency window of a klystron. The alumina ceramic is also suitably used for industrial machinery, such as a CVD device and an etching device, because of its excellent plasma resistance.

What is claimed is:

1. An alumina ceramic comprising alumina as a main component, an alkaline earth metal, and an element belonging to period 3, 4 or 5,
    wherein the alkaline earth metal and the element belonging to period 3, 4 or 5 have a higher first ionization energy than aluminum,
    wherein the alkaline earth metal is magnesium or calcium,
    wherein the element belonging to period 3, 4 or 5 is scandium, titanium, yttrium or niobium,
    wherein the alkaline earth metal, and the element belonging to period 3, 4 or 5 are a combination of Mg—Sc, Mg—Ti, Mg—Y, Ca—Sc, Ca—Y or Ca—Zr,
    wherein an electronegativity difference between the alkaline earth metal and the element belonging to period 3, 4 or 5 is 0 or more and 0.6 or less,
    wherein the total content of the alkaline earth metals and the elements belonging to period 3, 4 or 5 in the alumina ceramic is 0.05 wt % or more and 1 wt % or less based on the content of the alumina,
    wherein a ratio (x/y) of the grain boundary area (x) to the grain area (y) in the alumina ceramic is 0.0001 to 0.0005,
    wherein the density of the alumina ceramic is 3.8 g/cm³ or more and 4.0 g/cm³ or less, and
    wherein the secondary electron emission coefficient of the alumina ceramic is 5.0 or less.

2. The alumina ceramic according to claim 1, wherein the alumina ceramic is used in a high frequency generator and a plasma generator.

3. The alumina ceramic according to claim 1, wherein the alumina ceramic does not contain strontium or barium.

4. A method for preparing the alumina ceramic according to claim 1, the method comprising:
    mixing an alumina source, the alkaline earth metal, and the element of period 3, 4 or 5 so as to have 0.05 to 1 wt % of total weight of the alkaline earth metal and the element of period 3, 4 or 5 based on the alumina source,
    granulating a mixture of the alumina source, the alkaline earth metal, and the element of period 3, 4 or 5 so that it has a circularity of not less than 0.5 and that the alumina source has a particle size of 0.2 to 1.5 μm, wherein a mixed granule is formed, and
    compression molding and sintering the mixed granule.

5. The alumina ceramic according to claim 1, wherein the alumina ceramic consists essentially of the alumina, an oxide of the alkaline earth metal, and an oxide of the element belonging to period 3, 4 or 5.

* * * * *